(12) United States Patent
Park (10) Patent No.: US 9,917,735 B2
(45) Date of Patent: Mar. 13, 2018

(54) SYSTEM AND METHOD FOR BIG DATA AGGREGATION IN SENSOR NETWORK

(71) Applicant: Electronics and Telecommunications Research Institute, Daejeon-si (KR)

(72) Inventor: Hyeon Park, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 249 days.

(21) Appl. No.: 14/162,843

(22) Filed: Jan. 24, 2014

(65) Prior Publication Data

US 2014/0297826 A1  Oct. 2, 2014

(30) Foreign Application Priority Data

Apr. 1, 2013  (KR) .......................... 10-2013-0035400

(51) Int. Cl.

| G06F 15/173 | (2006.01) |
|---|---|
| H04L 12/24 | (2006.01) |
| H04L 29/08 | (2006.01) |
| H04W 4/00 | (2018.01) |

(52) U.S. Cl.
CPC ........ H04L 41/0853 (2013.01); H04L 41/069 (2013.01); H04L 67/12 (2013.01); H04W 4/006 (2013.01); H04L 41/0213 (2013.01)

(58) Field of Classification Search
CPC ...................................... H04L 12/26
See application file for complete search history.

(56) References Cited

U.S. PATENT DOCUMENTS

| 5,561,769 A * | 10/1996 | Kumar ................. H04L 41/0213 370/255 |
|---|---|---|
| 8,706,892 B2 * | 4/2014 | Nakamura .......... H04L 65/1046 370/221 |
| 8,844,041 B1 * | 9/2014 | Kienzle .................... H04L 41/12 709/224 |
| 2006/0202834 A1 * | 9/2006 | Moriwaki .............. G01D 21/00 340/573.1 |
| 2007/0050613 A1 * | 3/2007 | Islam ...................... H04L 45/52 713/150 |
| 2009/0034419 A1 * | 2/2009 | Flammer, III ........ H04L 45/124 370/238 |

(Continued)

FOREIGN PATENT DOCUMENTS

KR  2012-0085400 A  8/2012

OTHER PUBLICATIONS

"The Internet of Things"—McKinsey Quarterly, Mar. 2010. http://www.mckinsey.com/insights/high_tech_telecoms_internet/the_internet_of_things.*

*Primary Examiner* — Richard G Keehn
(74) *Attorney, Agent, or Firm* — Rabin & Berdo, P.C.

(57) ABSTRACT

A system for big data aggregation in a sensor network is provided, and the system includes a sensor network which comprises two or more sensor nodes connected to each other over a wired/wireless network and is configured to transfer sensor data generated by each of the two or more sensor nodes to a big data management unit by setting a destination address in the sensor data as an address of a big data management unit; and the big data management unit configured to distribute and dispersedly store the sensor data based on the set destination address of the sensor data.

12 Claims, 5 Drawing Sheets

(56) References Cited

U.S. PATENT DOCUMENTS

| | | | |
|---|---|---|---|
| 2009/0319691 A1* | 12/2009 | Buckley | H04L 29/12349 709/245 |
| 2011/0158160 A1* | 6/2011 | McCullough | H04W 40/02 370/328 |
| 2012/0044954 A1* | 2/2012 | Matsumoto | H04L 29/12028 370/465 |
| 2012/0182891 A1* | 7/2012 | Lee | H04L 43/04 370/252 |
| 2013/0223447 A1* | 8/2013 | Kahng | H04L 61/609 370/392 |
| 2013/0315102 A1* | 11/2013 | Kahng | H04L 61/103 370/254 |

* cited by examiner

SYSTEM AND METHOD FOR BIG DATA AGGREGATION IN SENSOR NETWORK

CROSS-REFERENCE TO RELATED APPLICATION(S)

This application claims the benefit under 35 U.S.C. § 119(a) of Korean Patent Application No. 10-2013-0035400, filed on Apr. 1, 2013, in the Korean Intellectual Property Office, the entire disclosure of which is incorporated herein by references for all purposes.

BACKGROUND

1. Field

The present invention is a technology for collecting big data for analysis, and, more particularly, for collecting big sensor data generated on a sensor network for analysis.

2. Description of the Related Art

With fast-spreading digital economy, we are increasingly living in a 'Big Data' environment in which unimaginably large amounts of information and data are produced. In the 'Big Data' environment, big data analytics is becoming important to process large unstructured data as well as large structured data. The typical big data analytics is Hadoop, an open-source software framework that supports data-intensive distributed applications, and the running of applications on large clusters of commodity hardware. In general, a big data service is provided based on Hadoop. Hadoop collects both structured data and unstructured data, processes the collected data set in a distributed network cluster in parallel, and extracts valuable information from the processed data set within a short time. Hadoop Distributed File System (HDFS) is an open source for storing big data dispersedly, that is, a technology for storing collected data reliably. The most important part of the big data analytics is collecting data before storing the data, and many data collection tools based on Hadoop supports collecting data in HDFS.

Generally, each sensor node composing a sensor network collects data, and the sensor network provides an application service using the collected data. The sensor network is located on an area network within a large infrastructure network. Thus, the collected data crosses over the area network to thereby be used in a server for an application service. In most cases, data generated in a sensor network is transferred to a server of an area network, and the server uses the data for a desired service. As such, sensor data is generated in a sensor network that is simply an area network within an infrastructure network, but collected by a server located at the center of the infrastructure network, so that there are challenges to provide a service by processing big data generated in sensors.

Each server of an area network collects sensor data transferred from the area network, and thus, the server needs to be in association with Hadoop in order to store the sensor data in HDFS. Yet, in most cases, a server is associated with a Hadoop to transfer collected data to a collector in HDFS. So, when the server transfers sensor data, collected from an area network, to the collector, the sensor data needs to be converted in a form suitable for the collector, so that heavy load may occur and memory usage may increase continuously.

Accordingly, if there are a lot of logs to be processed, the system may shut down, resulting in data delay. Consequently, it would be difficult to provide a big data service using sensors. In order to overcome these drawbacks, it is necessary to reduce the number of files to be monitored, and to apply both a deferred processing method and an asynchronous processing method. In other words, what is needed is a method for providing a highly-reliable big data service in real time to transfer big sensor data, generated on a sensor network, to a Hadoop-based collector.

SUMMARY

The following description relates to a method for transferring big sensor data, generated on a sensor network, to a Hadoop-based collector. More particularly, the following description relates to a method for providing a highly-reliable bit data service in real time by transferring sensor data directly to a collector without establishing an agent program by taking into consideration that a sensor node has low power consumption and limited memory storage, and that sensor data collection may lead to heavy load and deferred processing on a sensor network, in order to collect sensor data on a sensor network adaptively to a Hadoop-based sensor data collection method.

In one general aspect, a system for big data aggregation in a sensor network is provided, and the system includes a sensor network which comprises two or more sensor nodes connected to each other over a wired/wireless network and is configured to transfer sensor data generated by each of the two or more sensor nodes to a big data management unit by setting a destination address in the sensor data as an address of a big data management unit; and the big data management unit configured to distribute and store the sensor data dispersedly based on the set destination address of the sensor data. The sensor network may be established based on Internet Protocol (IP) for Machine to Machine and Internet of Things services so that it is easy to apply the sensor network to Hadoop. In addition, the sensor network may transfer and receive the sensor data using Internet Protocol version 6 (IPv6).

The sensor nodes on the sensor network may transfer the sensor data to the big data management unit using a Simple Network Management Protocol (SNMP) or a data transport protocol. Each of the sensor nodes may deliver a trap message, a sensor network-setting message, and a result of a sensor data request. The sensor network may transfers supervision over a fault in a component of the sensor network, a report of a detected fault in a component of the sensor network and/or operator control data to the big data management unit. The big data management unit may include a collector configured to aggregate sets of the received sensor data, and transfer the aggregated sensor data a distribution processing unit; and the distribution processing unit configured to dispersedly store the aggregated sensor data using Hadoop Distributed File System (HDFS), and analyze and process the aggregated sensor data stored in the HDFS using MapReduce.

In another general aspect, a method for collecting big data through a sensor network and a big data management unit is provided, and the method includes generating sensor data on a sensor network; setting a port number of the generated sensor data to indicate a big data management unit; collecting, at the big data management unit, the sensor data; and distribute and dispersedly storing, at the big data management unit, the sensor data. The distributing and dispersedly storing of the collected sensor data may include storing the collected sensor data using a Hadoop Distributed File System (HDFS), and analyzing the sensor data stored in the HDFS using MapReduce, and distributing and dispersedly storing the analyzed sensor data by filtering and sorting.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
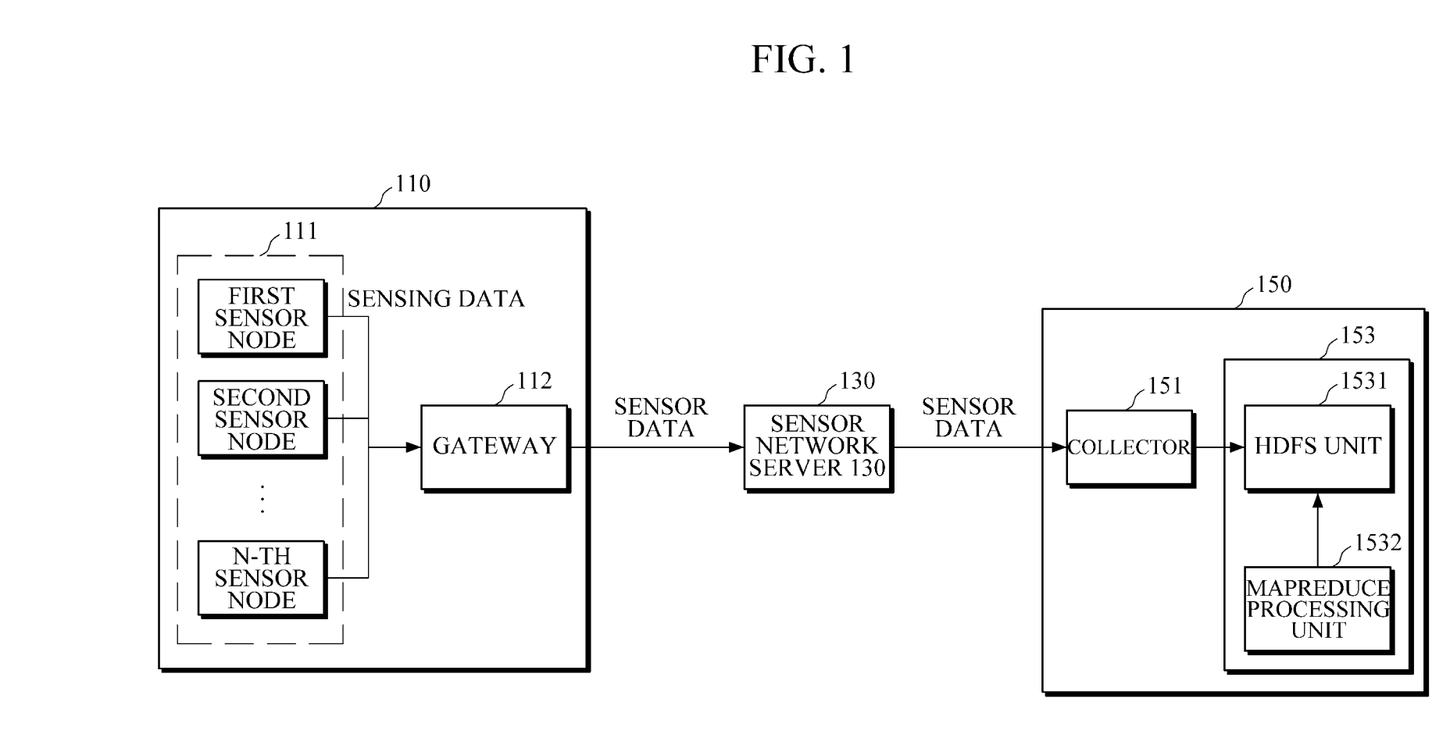
FIG. 1 is a diagram illustrating a configuration of a big data collection system on a sensor network according to an exemplary embodiment of the present invention.

FIG. 1 is a diagram illustrating a configuration of a big data aggregating system of a sensor network according to an exemplary embodiment of the present invention.

Referring to FIG. 1, the big data aggregation system includes a sensor network 110, a sensor network server 130, and big data management unit 150.

In a conventional Hadoop-based data aggregation method, a plurality of agents are placed in multiple locations on a network to collect log data and transfer the collected log data to a collector. Yet, in FIG. 1, a plurality of sensor nodes 111 on the sensor network 110 are designated as agents to help the conventional Hadoop-based data aggregation method to be performed adaptively on a sensor network, so that the sensor nodes 111 may transfer data directly to a collector 151. To make a sensor node 111, which is designated as an agent, to recognize a collector 151, which is designated as a destination, a Hadoop-based agent program is applied to the sensor node 111 according to characteristics thereof. The sensor node 111 applied with the Hadoop-based agent program is able to directly access the collector. Accordingly, sensor data of the sensor node 111 is transferred to the collector 151 through the sensor network server 130, that is, a relay server, and the sensor data transferred to the collector 151 is dispersedly stored and processed by a distribution processing unit.

The sensor network 110 refers to a network which includes two or more sensor nodes 111. Each sensor node 111 composing the sensor network 110 acts as an agent that is installed in a device where the log data to be collected by Hadoop is generated. The sensor nodes 111 are installed on multiple locations that require data collection in order to generate sensor data by using detected data. The sensor data collected by the sensor nodes 111 may be different in form and type according to a sensor of each sensor node 111. For example, if a sensor network is designed for water quality assessment, each sensor node assesses the water quality in its own location to generate log data indicating water quality.

The sensor network 110 may be usually based on Internet Protocol (IP) for a Machine to Machine service and an Internet of Things service. The IP-based sensor network 110 may be easily adaptively applied to Hadoop that collects Hadoop-based big data. Each sensor node 111 on the IP-based sensor network 110 may include a port number or a destination address when configuring a packet of the sensor data. Using the port number and the destination address, the sensor data may be in association with the collector 151 of the big data management unit 150. In this manner, without a program for conventional Hadoop-based agents, it is possible to easily transfer sensor data to the collector 151 using the packet configuration method of the sensor node 111. As a result, big data collection may be performed in real time.

Two or more sensor nodes 111 are generally connected to each other via a gateway 112 over a wired/wireless network. Sensor data collected by the two or more sensor nodes 111 is transferred to a sensor network server 130 via the gateway 112 over a wired/wireless network.

In particular, messages are exchanged using an address of Internet Protocol version 6 within the sensor network 110, but, after being transferred to the sensor network server 130, sensor data and messages are transferred and received using an address of Internet Protocol version 4 on the Infrastructure network. Using a Simple Network Management Protocol (SNMP) and/or a data transmission protocol, each sensor node 111 on the sensor network 110 may transfer three types of messages, such as a trap message, a sensor network-setting message (e.g., a ReqSet/ReqGet message), and a result of a sensor data request.

Sensor data generated in the sensor node 111 on the sensor network 110 may be transferred to the sensor network server 130 via the gateway 112. But, if a port number or a destination address of the sensor data generated in the sensor node 111 is set as a port number or address of the collector 151, the sensor data may be transferred directly to the collector 151. A trap message is an SMNP message for network management data generated in the sensor node 111, and is transferred to the sensor network server 130. However, if a port number or a destination address of the trap message is set as a port number or address of the collector 151, the trap message may be transferred directly to the collector 151.

The sensor network server 130 collects and analyzes the sensor data received from the sensor network 110, and stores the analyzed sensor data in a database. The sensor data stored in the sensor network server 130 may be used when performing an application service. If a destination address or a port number of the sensor data generated in the sensor node 111 is set to indicate the sensor network server 130, the sensor data is to be stored in the sensor network server 130.

The big data management unit 150 includes a collector 151 and a distribution processing unit 153. The big data management unit 150, located within a cloud server or an enterprise server, collects, sorts out, and dispersedly stores sensor data received from the sensor network.

The collector 151 receives sensor data from sensor nodes 111 on the sensor network 110. The sensor data generated in each sensor node 111 may be set to have a port number or destination address indicating the collector 151, and, in this case, the sensor data may be transferred directly to the collector 151. The collector 151 aggregates sensor data sets, and transfers the aggregated sensor data to the distribution processing unit 153. A data source and sink model is applied to the relationship between the collector 151 and the sensor network 110. That is, each sensor node on the sensor network 110 acts as a source, and sensor data generated in the sensor node 111 may be transferred in one direction to the collector 151, which acts as a sink.

The distribution processing unit 153 includes a Hadoop Distributed File System (HDFS) unit 1531 and a MapReduce processing unit 1532.

The HDFS unit 1531 refers to a Hadoop Distributed File System (HDFS) that stores received data dispersedly. In more detail, the HDFS 1531 dispersedly stores sensor data received from the collector 151. The HDFS is a solution for storing and processing a large file, and may be installed not only in a single server, but in multiple servers. The HDFS unit 1531 manages Meta information of sensor data, and dispersedly stores the actual sensor data in multiple data nodes.

The sensor data generated on the sensor nodes 111 on the sensor network 110 is large data sets, that is, big data. Accordingly, the sensor data is dispersedly stored in the HDFS unit 1531 using HDFS for dispersed processing and storage.

The MapReduce processing unit 1532 processes and manages the HDFS unit 1531 using MapReduce. MapReduce refers to a programming model used to process and analyze big data more rapidly and more safely. In addition, MapReduce is excellent in analyzing logs, constructing indexes, and performing searches with regard to big data. In addition, the sensor data transferred to the HDFS unit 1531 is big data, and structured data and unstructured data are scattered in the sensor data. Accordingly, the MapReduce processing unit 1532 processes dispersedly stored sensor data by classifying the sensor data stored in the HDFS unit 1531 according to data types through filtering and sorting processes.

Figure 2:
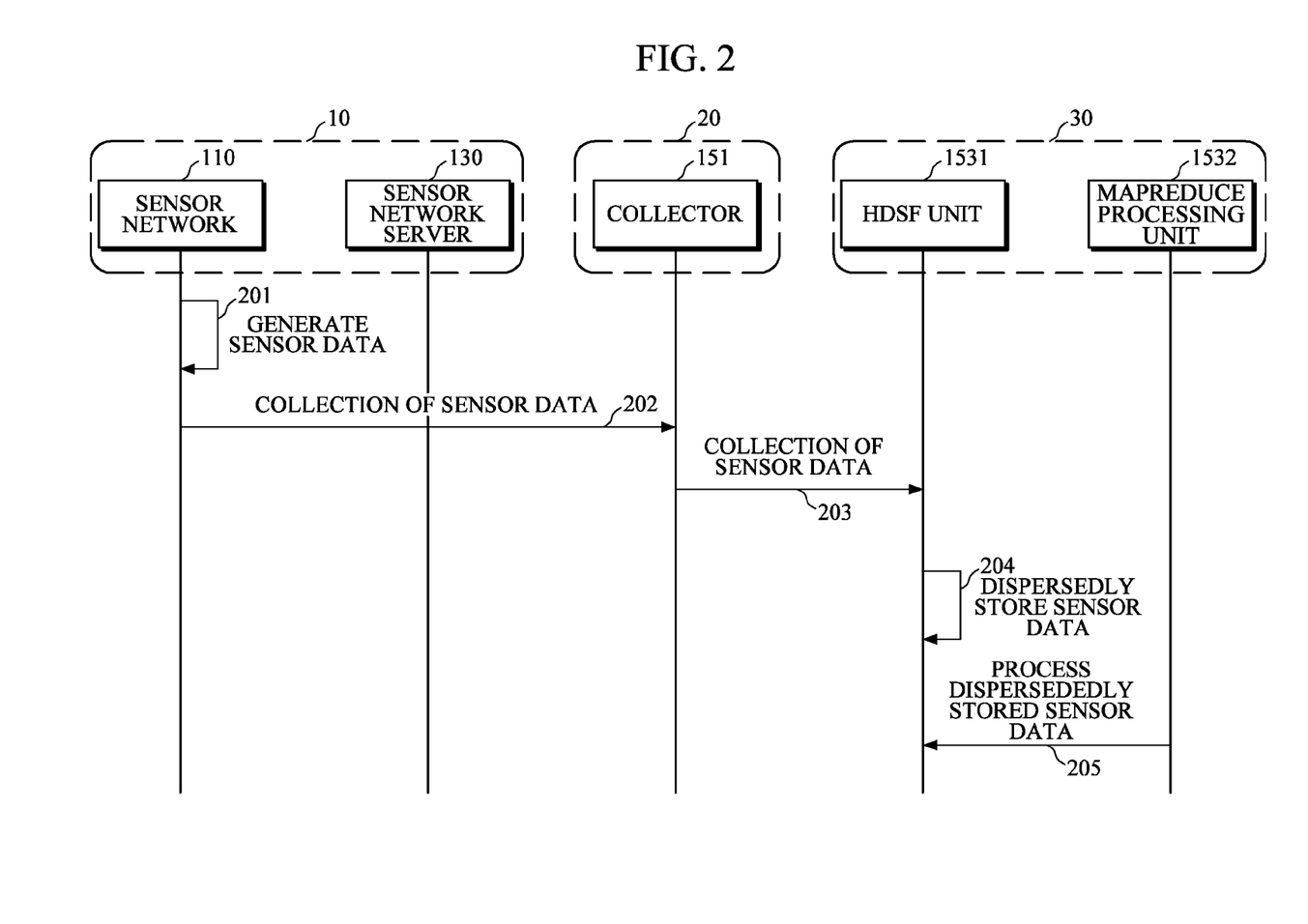
FIG. 2 is a flow chart illustrating a data flow in a big data collection system of a sensor network according to an exemplary embodiment of the present invention.

FIG. 2 is a flow chart illustrating a data flow in a big data collection system of a sensor network according to an exemplary embodiment of the present invention.

Referring to FIG. 2, a data flow in a big data collection system of a sensor network may be divided into three tiers, such as an agent tier 10, a collector tier 20, and a storage tier 30.

The agent tier 10 is a tier for reading a log file, extracting data from the log file, generating a data stream, and transferring the extracted data stream to the collector tier 20. The agent tier 10 is located in a machine that requires data collection. In FIG. 2, a set of the sensor network 110 and the sensor network server 130 corresponds to the agent tier 10. In 201, sensor data is generated in two or more sensor nodes on the sensor network to be collected. If the sensor network 110 is designed for water quality assessment, the sensor data collected in each sensor node may be data indicating a measurement of water quality. In 202, the sensor network 110 transfers the generated sensor data to the collector 151. By setting a port number or destination address of the sensor data as a port number or address of the collector 151, the sensor network 110 may transfer the sensor data directly to the collector 151. In this way, the sensor network 110 may act as an agent of the agent tier 10.

The collector tier 20 is a tier for aggregating big data generated in the agent tier 10, and then storing the aggregated big data in the storage tier 30. In FIG. 2, the collector 151 corresponds to the collector tier 20. If sensor data sets are received from the sensor network 110, the collector 151 transfers the received sensor data sets to the HDFS unit 1531 on the storage tier 30. That is, the collector 151 receives sensor data from the sensor network 110. The sensor data generated on the sensor network 110 may be set to have a port number of a destination address of the collector 151, and, in this case, the collector 151 aggregates the received sensor data sets, and transfers the aggregated sensor data to the distribution processing unit 153. A data source and sink model are applied to the relationship between the collector 151 and the sensor network 110. That is, the sensor network 110 acts as a source, and sensor data generated on the sensor network 110 may be transferred in one direction to the collector 151, which acts as a sink.

The storage tier 30 is a tier for dispersedly storing and processing big data. In FIG. 2, a set of the HDFS unit 1531 and the MapReduce processing unit 1532 corresponds to the storage tier 30. In 204, if sensor data is received from the collector 151 corresponding to the collector tier 20, the HDFS unit 1531 dispersedly stores the received sensor data. The sensor data, generated on and received from the sensor network 110, is large data sets, that is, big data. Thus, the received sensor data is dispersedly stored and processed in the HDFS unit 1531 using the HDFS.

In 205, the MapReduce processing unit 1532 processes and manages the HDFS unit 1531 using MapReduce. MapReduce, a programming model for processing large data sets more rapidly and more safely, is excellent at analyzing logs, constructing indexes, and performing searches with regard to big data. The sensor data transferred to the HDFS unit 1531 is large data sets in which structured data and unstructured data are scattered. Thus, the MapReduce processing unit 1532 processing dispersedly stored sensor data by classifying the big data stored in the HDFS unit 1531 according to data types through filtering and sorting processes.

Figure 3:
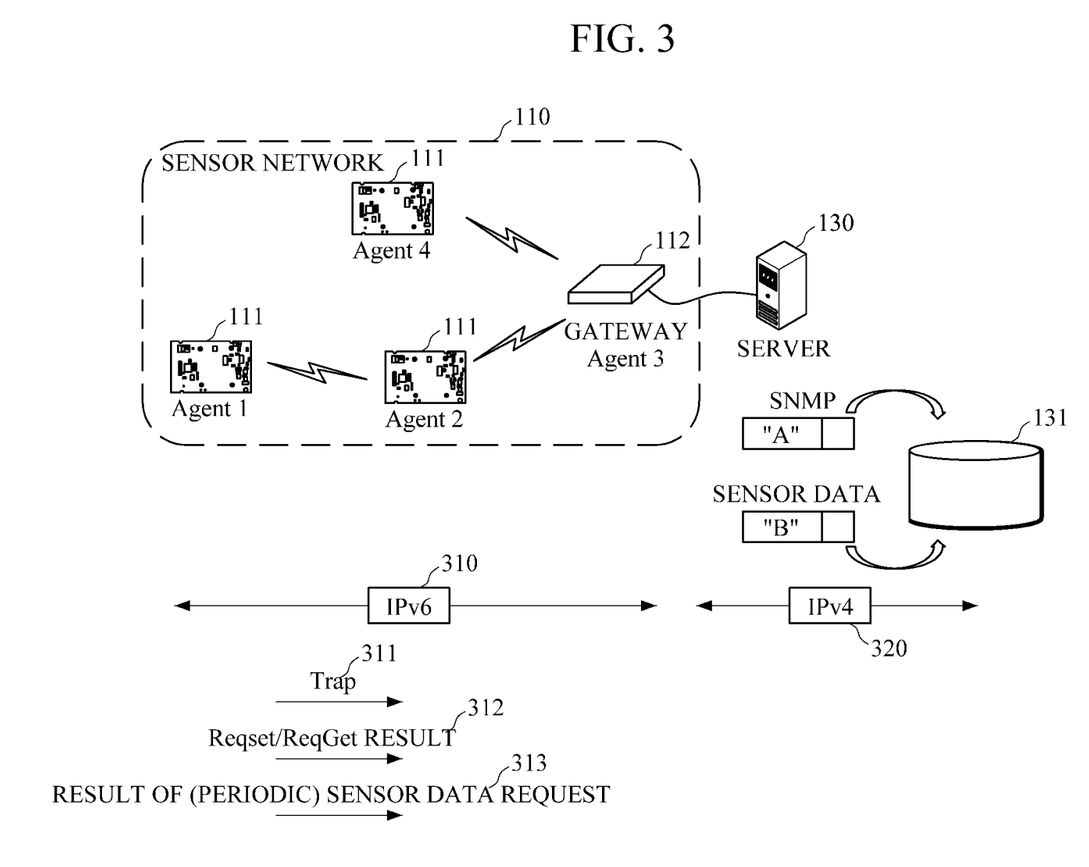
FIG. 3 is a diagram illustrating a procedure to process data on a sensor network according to an exemplary embodiment of the present invention.

FIG. 3 is a diagram illustrating a data processing flow on a sensor network according to an exemplary embodiment of the present invention.

Referring to FIG. 3, sensor data is transferred from and received using an IPv6 address 310 within the sensor network, but, after being transferred to the server network server 130, the sensor data is transferred and received using an Internet Protocol 4 (IPv4) address within the infrastructure network. Sensor nodes 111 on the sensor network 110 exchanges three types of sensor messages with the sensor network server 130 using an SNMP or a data transmission protocol. The three types of sensor messages are a trap message 311, a sensor network-setting message (e.g., a ReqSet/ReqGet message) 312, and a result 313 of a sensor data request. The trap message 311 is a message to transfer network management information generated on the sensor network 110 to the sensor network server 130. The sensor network-setting message 312 is a message to control the sensor network server 130 to set management information of the sensor network 110, or a message to fetch management information of the sensor network 110 from the sensor network server 130. The request 313 from a sensor data request is a message used to periodically transfer sensor data generated on the sensor network 110 to the sensor network server 130. The sensor data generated in each sensor node 111 on the sensor network 110 is collected by the sensor network server 130 through a gateway 112 over a wireless network. The sensor network server 130 collects and analyzes the sensor data, stores the analyzed sensor data in a database 131, and then uses the stored sensor data when performing an application service.

Table 1 shows examples of types of data that can be collected on the sensor network 110 designed for water quality assessment. The types of data that can be collected through the sensor network 110 largely include sensor data and control data. The data to be collected on the sensor network 110 may include periodically collected sensor data, periodic monitoring (supervision) of a fault in a component of the sensor network, a report (trap) of a detected fault in a component of the sensor network, information on the current state of the sensor network 110, and operator control data. The sensor data described in FIGS. 1 to 3 may include examples of data shown in Table 1, and other types of data.

TABLE 1

Examples of data that can be collected on a sensor network for water quality assessment.

| Sensor data | Fault Information (Trap) | State Information | Operator Control |
|---|---|---|---|
| Water Temperature | Fault in water quality sensor | Battery remainder | Reset Sensor |
| Electrical Conductivity | Fault in cleaning device | Sensor state | Reset Sensor Storage |
| Dissolved Oxygen | Low voltage of battery | Current level | Cleaning device operation control |
| Hydrogioneion-concentration | Fault in submerged sensor node | Instantaneous flow | Enable sensor |
| Oxidation Reduction Potential | Fault in water depth sensor | Temperature | Disable sensor |
| Turbidity | Fault in velocity A | Cleaning device operation cycle information | Reset USN sensor module |
| Chlorophyll | Fault in velocity B | Information about measurement period of sensor data | Cleaning device operation cycle change |
| NO$_3$—N | Report of Restart | Warning water level | Measurement period of sensor data change |
| NH$_4$—N | Fault in RF module | Water immersion level | Set warning water level |
| Depth of Water | Sensor fault | Current velocity A | Set water immersion level |
| Instantaneous flow | Device fault | Current velocity B | Reset USN communication module |
| Velocity#1 | Power fault | Do probe state | Reset velocity A sensor |
| Velocity#2 | pH probe fault | Tur probe state | Reset velocity B sensor |
| | | Chl probe state | Reset water depth sensor |
| | | WT probe state | |
| | | pH probe state | |
| | | EC probe state | |
| | | ORP probe state | |

Figure 4:
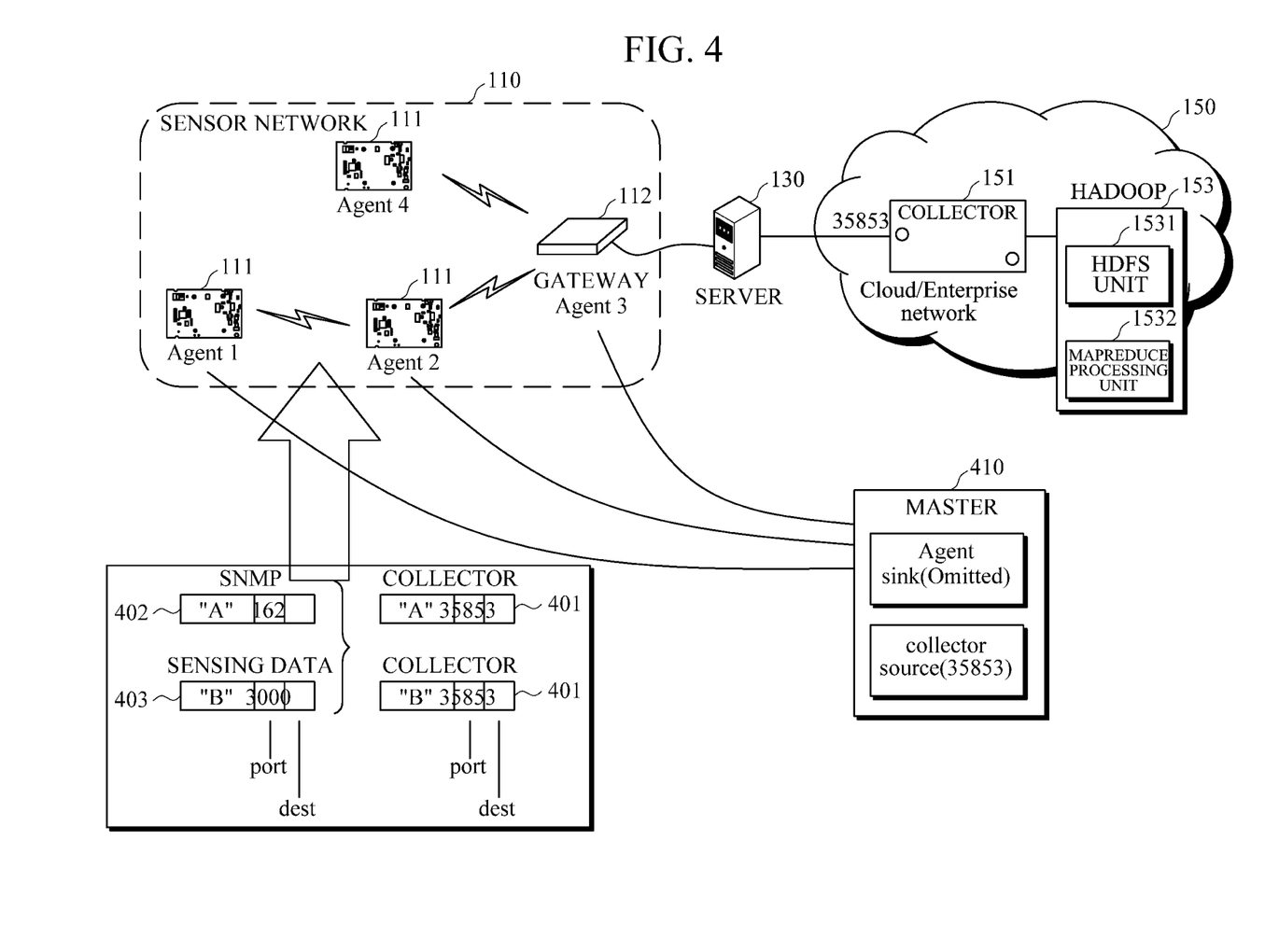
FIG. 4 is a diagram illustrating a procedure to collect big data on a sensor network according to an exemplary embodiment of the present invention.

FIG. 4 is a diagram illustrating a procedure to collect big data in a sensor network according to an exemplary embodiment of the present invention.

Referring to FIG. 4, a sensor network 110 is based on an Internet Protocol (IP), and may be adaptively applied to Hadoop that is a system for big data collection.

A port number or destination number 401 of a collector 151 is assumed to be 35853. In general, sensor data generated in each sensor node 111 is transferred to a sensor network server 130 through a gateway 112 using a sensor data protocol. Yet, if the port number of destination number 401 of the sensor data is set as a port number or destination address of the collector 151, the sensor data, collected for a big data service, may be transferred directly to an HDFS unit 1531 through the collector 151. In addition, an SNMP message used for network management data generated in each sensor node 111 is generally transferred to the sensor network server 130. However, if the port number of destination number 402 of the network management data is set as the port number or destination address 401 of the collector 151, the network management data, collected for a big data service, is able to be transferred directly to the HDFS unit 1531 through the collector 151. A master 410 is a function that enables dynamic setting of data flow when sensor data is transferred from a Hadoop-based agent node to a collector node. Using the master 410, the sensor node 111 on the sensor network 110 may omit an agent's sink, and instead designate a source of a collector to be a source code of the actual collector 151 That is, the relationship between sensor node 111 and the collector 151 on the sensor network 110 is the relationship between a sink and a source. Accordingly, by setting a source of each sensor node 111 to indicate a port number of the collector 151 without setting a sink, sensor data generated in a plurality of the sensor nodes 111 is transferred to the collector 151.

Figure 5:
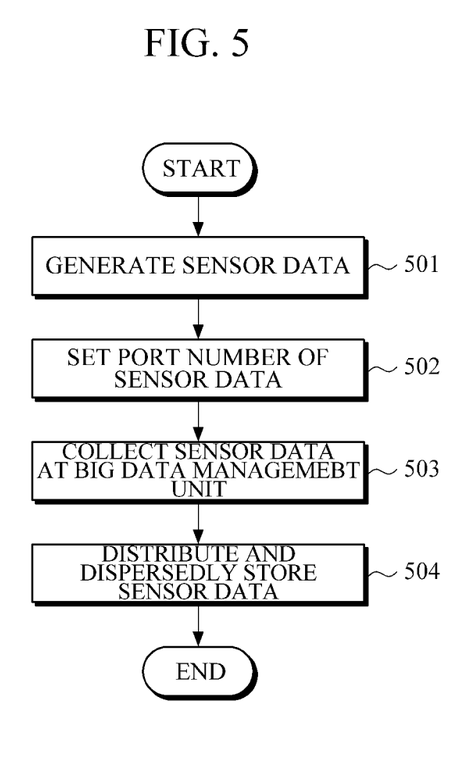
FIG. 5 is a flow chart illustrating a big data collection method of a sensor network according to an exemplary embodiment of the present invention.

FIG. 5 is a flow chart illustrating a method for collecting big data on a sensor network according to an exemplary embodiment of the present invention.

In 501, referring to FIG. 5, the big data collection method of a sensor network starts out by generating sensor data based on data collected in sensor nodes that exist on a sensor network. The sensor network includes two or more sensor nodes. Each sensor node acts as an agent installed in a device that generates log data to be collected in Hadoop. The sensor nodes are dispersedly installed at multiple locations that require data collection in order to generate sensor data based on detected data. The sensor network is usually based on an IP for a Machine to Machine service and an Internet of Things service. The IP-based sensor network 110 may be adaptively applied to Hadoop, which is a big data collection system.

In particular, a message may be exchanged using an IPv6 address within the sensor network, but, after the sensor network server receives the message, the sensor data and the message may be transferred, and received using an IPv4 address within an Infrastructure network. Sensor nodes on the sensor network may transfer three types of sensor messages using an SNMP or a data transmission protocol. The three types of sensor messages are a trap message, a sensor network-setting message (e.g., a ReqSet/ReqGet message), and a result of a sensor data request. The trap message is used to transfer network management information occurring on the sensor network to the sensor network server. The sensor network-setting message is a message to control the sensor network server to set management information of the sensor network, or a message to fetch management information of the sensor network from the sensor network server. The result of a sensor data request is a message to periodically transfer sensor data generated in the sensor network to the sensor network server. The data generated on the sensor network basically includes data, and may further include control data of the sensor network. The data to be collected on the sensor network includes periodically collected sensor data, periodic monitoring (supervision) of a fault in a component of the sensor network, a report (trap) of a detected fault in a component of the sensor network, information about the current state of the sensor network, and operator control data.

In 502, a port number of the sensor data is to be set in 502. By setting a port number or destination address of the sensor data generated on the sensor network as a port number or destination address of a collector, it is possible to transfer big data for a big data service directly to an HDFS unit through the collector. In addition, by setting a port number or destination address of an SNMP message necessary to manage network management data generated on the sensor network as a port number or destination address of the collector, it is possible to transfer big data for a big data service directly to the HDFS unit through the collector.

In 503, a big data management unit collects sensor data. In more detail, sensor data with a preset port number is transferred to the big data management unit. Based on the port number, the sensor data is transferred directly to the collector of the big data management unit.

Then, the big data management unit distributes the received sensor data and dispersedly stores the distributed sensor data in 504. In more detail, the big data management unit stores the sensor data in HDFS. The HDFS is a solution system for storage and processing of a large file, and may be used in multiple servers, as well as a single server. The sensor data generated on and transferred from the sensor network are large data sets, that is, big data. Thus, in order to distribute and store the received sensor data dispersedly, the HDFS is used. In addition, MapReduce is used for processing and managing the HDFS. The MapReduce, a programming model to process and analyze big data more rapidly and more safely, is excellent in analyzing logs, constructing indexes, and performing searches with regard to big data. The received sensor data is big data where structured data and unstructured are scattered, so MapReduce is used to processing dispersedly stored sensor data by classifying the sensor data stored in the HDFS through filtering and sorting processes.

According to the above-described exemplary embodiments, a system and method for collecting big data of a sensor network is to transfer a large amount of sensor data to a big data Hadoop-based collector in real time. A sensor node has low power consumption and a memory limitation, and collecting sensor data may lead to heavy load or deferred processing on a sensor network. By taking into consideration the above features in order to collect sensor data on a sensor network adaptively to a Hadoop-based sensor data collection method, the collected sensor data is transferred directly to a collector. In this manner, it is possible to provide a highly-reliable big data service of a sensor network in real time without establishing an agent program.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system having a hierarchical structure for big data aggregation, comprising:
    a sensor network, included in a first tier of the system, including:
        a plurality of sensor nodes that are each configured to generate sensor data;
        a gateway; and
        a sensor network server configured to receive the sensor data generated by each of the sensor nodes through the gateway and transmit the sensor data to a collector preceding a Hadoop system which stores the sensor data dispersedly, the collector being included in a second tier of the system and aggregating the sensor data received from the sensor network,
    wherein communication between each of the sensor nodes and the sensor network server included in the first tier is performed based on a first version of Internet Protocol (IP) while communication between the sensor network server included in the first tier and the collector included in the second tier is performed based on a second version of IP which is different form the first version of IP, and
    wherein a destination address of the sensor data generated by each of the sensor nodes is set to an IP address of the collector rather than an IP address of the sensor network server.

2. The system of claim 1, wherein the first version of IP corresponds to Internet Protocol version 6 (IPv6), and the second version of IP corresponds to Internet Protocol version 4 (IPv4).

3. The system of claim 1, wherein each of the sensor nodes on the sensor network transfers the sensor data to the collector using a Simple Network Management Protocol (SNMP) or a data transport protocol.

4. The system of claim 3, wherein each of the sensor nodes delivers a trap message, a sensor network-setting message, and a result of a sensor data request.

5. The system of claim 1, wherein
    the collector delivers the aggregated sensor data to a distribution processing unit of the Hadoop system that is configured to dispersedly store and process the aggregated sensor data, and
    the distribution processing unit is configured to dispersedly store the aggregated sensor data using Hadoop Distributed File System (HDFS), and to analyze and process the aggregated sensor data stored in the HDFS using MapReduce.

6. The system of claim 1, wherein each of the sensor nodes transfers at least one of supervision over a fault in a component of the sensor network, a report of a detected fault in a component of the sensor network and operator control data to the collector.

7. A method for transmitting sensor data for big data aggregation with a sensor network server included in a sensor network, the method comprising:
    receiving, by the sensor network server, sensor data generated by each of sensor nodes in the sensor network through a gateway in the sensor network transmitting, by the sensor network server, the sensor data to a collector preceding a Hadoop system which stores the sensor data dispersedly, wherein the sensor network includes the sensor nodes, the gateway and the sensor network server, and is included in a first tier of a system for big data aggregation, and the collector is included in a second tier of the system, wherein communication between each of the sensor nodes and the sensor network server included in the first tier is performed based on a first version of Internet Protocol (IP), while communication between the sensor network server included in the first tier and the collector included in the second tier is performed based on a second version of IP which is different form the first version of IP, and wherein the destination address of the sensor data generated by each of the sensor nodes is set to an IP address of the collector rather than an IP address of the sensor network server.

8. The method of claim 7, further comprising:

collecting, by the collector, the sensor data transmitted from the sensor network server, and distributing and dispersedly storing, by a distribution processing unit of the Hadoop system, the collected sensor data, including storing the collected sensor data using a Hadoop Distributed File System (HDFS), analyzing the sensor data stored in the HDFS using MapReduce, and distributing and dispersedly storing the analyzed sensor data by filtering and sorting.

9. The method of claim 7, wherein the first version of IP corresponds to Internet Protocol version 6 (IPv6), and the second version of IP corresponds to Internet Protocol version 4 (IPv4).

10. The method of claim 7, wherein each of the sensor nodes transfers data using a Simple Network Management Protocol (SNMP) or a data transmission protocol.

11. The method of claim 10, wherein each of the sensor nodes transfers at least one of a trap message, a sensor network-setting message, and a result of a sensor data request.

12. The method of claim 7, wherein each of the sensor nodes transfers at least one of supervision over a fault in a component of the sensor network, a report of a detected fault in a component of the sensor network, and an operator control data to the collector.

* * * * *